United States Patent [19]

Geskin

[11] Patent Number: 4,561,886

[45] Date of Patent: Dec. 31, 1985

[54] METHOD OF HEATING, MELTING AND COAL CONVERSION AND APPARATUS FOR THE SAME

[76] Inventor: Ernest S. Geskin, 21 Karen Pl., Edison, N.J. 08817

[21] Appl. No.: 476,012

[22] Filed: May 2, 1983

Related U.S. Application Data

[62] Division of Ser. No. 196,265, Oct. 14, 1980, Pat. No. 4,422,872.

[51] Int. Cl.⁴ .............................................. C21C 7/00
[52] U.S. Cl. ................................. 75/51.2; 266/138; 266/171
[58] Field of Search .................. 75/63, 65, 51, 60, 52; 266/138, 171

[56] References Cited

U.S. PATENT DOCUMENTS

| 1,269,974 | 6/1918 | Stevenson | 266/138 |
| 2,978,315 | 4/1961 | Schenck | 75/11 |
| 3,635,457 | 1/1972 | King | 75/65 R |
| 4,389,246 | 6/1983 | Okamura | 75/60 |

Primary Examiner—Peter D. Rosenberg
Attorney, Agent, or Firm—Ilya Zborovsky

[57] ABSTRACT

A method of and an apparatus for heating, melting and production of gaseous fuel include supplying air, coal, steam into a melt. The melt contains elements readily oxidized by air. These elements produce oxides readily reduced by carbon. The overall results of the reactions of elements oxidation and reduction consist in the production of CO containing gas and evolving heat. The heat evolved is extracted from the melt by submergence of solid to be heated into the melt, by injection of heated gases into molten slag, by heat exchange between the wall confining the melt and gas, liquid or solid to be heated, or by conversion of steam into $H_2$ and CO.

1 Claim, 3 Drawing Figures

METHOD OF HEATING, MELTING AND COAL CONVERSION AND APPARATUS FOR THE SAME

This is a division of application Ser. No. 196,265, filed Oct. 14, 1980, now U.S. Pat. No. 4,422,872.

BACKGROUND OF THE INVENTION

The present invention relates to a method of and an apparatus for heating, melting and production of gaseous fuel.

Conventional methods of heating consist in fuel combustion and heat delivery to a material to be treated, by means of flame radiation and convection. Substantial disadvantages of the conventional methods are consumption of scarce kinds of fuel, nonuniformity of the temperature field and oxidizing atmosphere inside a furnace. Another conventional method is based upon the utilization of electric energy. Disadvantages of these methods are a low overall energy efficiency and nonuniformity of the temperature field.

A fluidized bed reactor provides a means for coal combustion and for distribution of heat generation in the space of the reactor. However, this reactor can be used only for heating of fine, lumpy materials. Heat generated in the fluidized bed can be extracted only in a chamber separated from that of combustion. The separation of the heat generation and extraction restricts application of such furnaces.

Uniform heating conditions and protective medium are achieved by heating in a liquid bath. However, energy efficiency of these furnaces is low, and they use gaseous or oil fuel.

The most conventional way of gas heating consists in combustion. However, combustion changes the gas composition. In many cases, combustion is based on the utilization of scarce oil and gas fuel. Gas heating can also be carried out without changing the chemical composition by heat transfer between a heat source and a heated gas. Heat can be extracted from combustion products or high temperature wastes. Another conventional method of gas heating consists in a heat exchange between gases; one of these gases is a heat receiver, whereas the other of the gases is a heat source. Heat can be transferred through ceramic or metal walls separating gas flows. This method is employed in boilers and recuperators. The drawback of such heating consists in the cost of material used for manufacturing gas exchangers and restrictions imposed on the temperature and pressure of a heated gas.

Another conventional method of gas heating consists in heat extraction from a heat source by a solid accummulator and heat transfer of this heat to a gas to be preheated. The implementation of this method by means of a periodical process is brought about in regenerators, caupers, stoves and similar devices. Continuously this method is brought about in heat exchangers with moving elements (as disclosed, for example, in R. Shchumann. Metallurgical Engineering, v.l, Addison-Wesley, 1952, p.p 132–133). High thermal resistance of a solid restricts possible amount of heat accumulated. The temperature of gas heating is restricted and the cost of construction is relatively high.

The general shortcomings of conventional gas heaters are their high cost, restricted temperature of preheating and impossibility to extract heat from all kinds of wastes, for example, from polluted gases, from slag and so on.

Uniform heating conditions and utilization of chemical energy of carbon are achieved in steel-making converters and open hearth furnaces. However, the amount of heat available in these reactors is limited by the chemical energy of carbon dissolved in pig iron. This restricts application of this method.

The amount of energy available in a reactor similar to a converter can be increased by simultaneous injection of coal and air (oxygen) into a melt. One example of such reactors is given in the U.S. Pat. No. 3,711,275. However, the heat evolved in the reactors disclosed in this patent can be supplied only to a material absorbed in a bath. Sensible heat of flue gases and part of chemical energy of CO cannot be used in these reactors, and can be recovered only by means of air and material preheating. These drawbacks prevent effective utlization of the above mentioned method of material heating, and the described reactor cannot be used for gas heating.

SUMMARY OF THE INVENTION

Accordingly, it is an object of the present invention to provide a method of and an apparatus for heating, melting and coal conversion, which avoid the disadvantages of the prior art.

It is another object of the present invention to provide a method which can be accomplished in somewhat reconstructed, operating or abondoned conventional furnaces; for example in soaking pits or open hearth furnaces.

Still another object of the present invention is to carry out heating and melting in conventional furnaces solely by using coal.

It is also an object of the present invention to reduce hazardous impact of the furnace atmosphere (surface oxidation, decarburization) on the material treated.

An additional object of the present invention is to reduce nonuniformity of the energy supply to the material treated, to increase the thermal efficiency of furnaces and to improve the furnace control.

It is also additional object of the invention to increase attainable temperature of a heated gas, and to simplify an equipment required for gas heating.

It is also an object of the present invention to increase the utilization of heat of waste gas and liquid products for gas heating.

A further object of the invention is to use coal for high temperature gas heating without changes in gas composition.

Still a further object of the present invention is to replace refractory material in gas heaters by molten slag or other nonexpensive melt.

Yet another object of the invention is to replace high quality metal tubes for boilers by nonexpensive material.

It is also an object of the invention to increase the reliability of the apparatus for gas heating by reduction of stresses in gas containing elements subjected to high temperature.

Another object of the present invention is to reduce heat losses and costs of the apparatus for heating by reduction in their sizes.

It is a further object of the invention to combine heating and gasification of coal.

The principle object of the present invention is to develop a reliable method of utlization of chemical energy of coal and heat content of industrial wastes (flue gases, slag etc.) for heating of solid, liquid and gaseous materials.

In keeping with these objects and with others which will become apparent hereinafter, one feature of the present invention resides in that coal, air, steam and flux agents are injected simultaneously into a melt. The melt contains metals readily oxidizable by air. Metal oxides are readily reduced by coal. CO gas and heat are evolved in this process.

The temperature of the melt is controlled by the rate of coal and air supply. The melt-gas emulsion volume is controlled by the pressure in the vessel and the rate of air supply. The melt flows around a heating chamber and through the chamber by means of channels similar to radiant tubes in conventional furnaces. Combustion products evolved in the melt and containing mostly $N_2$, CO and $H_2$ flow through the heating chamber, around the outside of the materials to be heated, through an air preheater, a boiler, and eventually arrive into a gas holder. Heat extraction from the melt can be achieved by immersing a material to be heated into the emulsion. The process can include both heating by combustion products and immersion into emulsion. Heat extraction can be carried out by melt barbotage by air or gases, or by injection of water and barbotage by emerging steam. Heat can also be extracted from the melt by flow of heated liquid or gaseous material through enclosures immersed into the melt.

The invention also includes an apparatus for implementing the above shortly described method. The novel features of the present invention will be defined in the appended claims. The invention itself, however, will be best understood from the following description which is accompanied by the following drawings.

DESCRIPTION OF PREFERRED EMBODIMENTS

Figure 1:
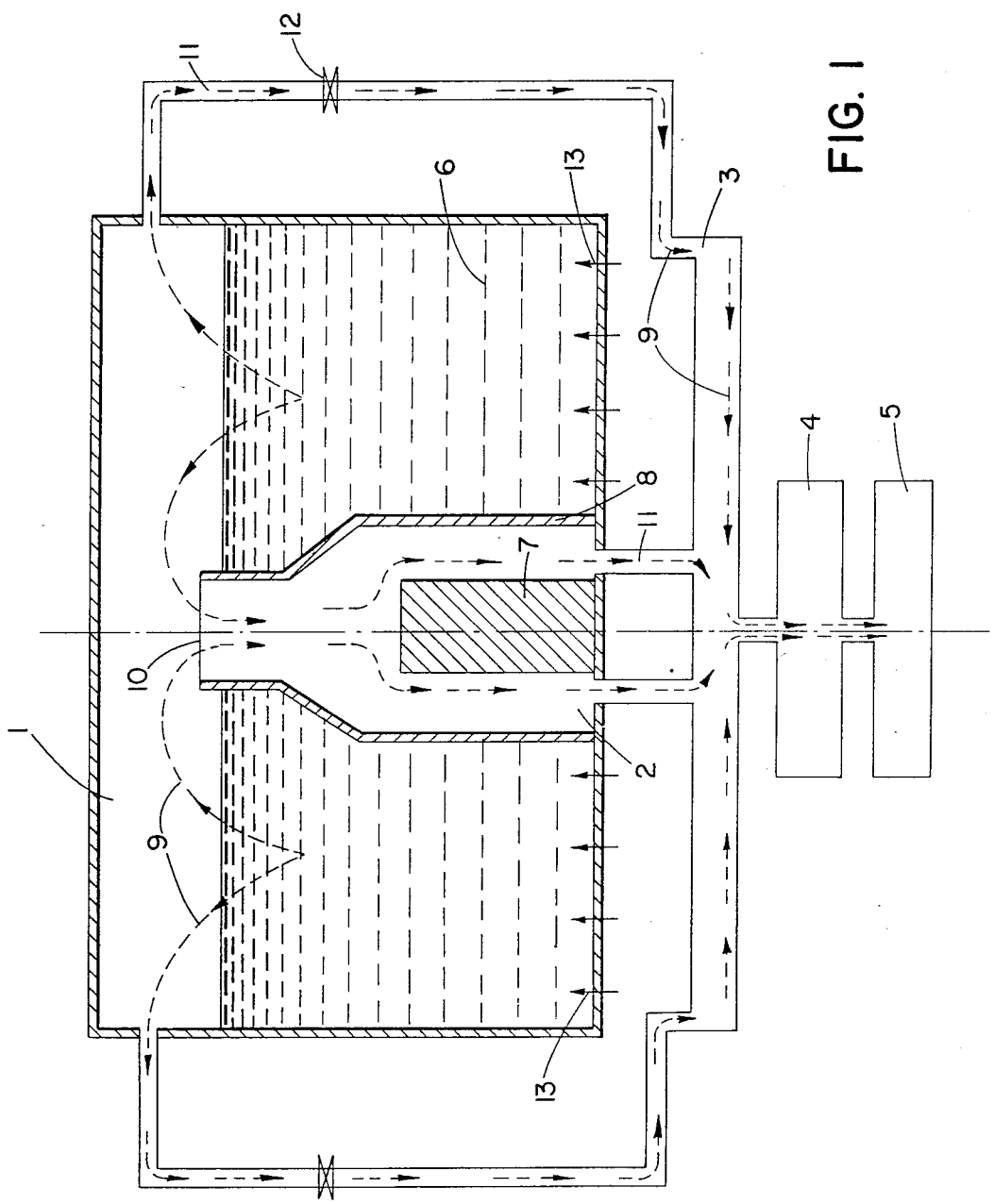
FIG. 1 is a schematic view of an apparatus in which a melt flows around a heating chamber and combustion products pass through the chamber, in accordance with the present invention.

An apparatus in accordance with the present invention is shown in FIG. 1 of the drawing and has a vessel 1 connected with a heating chamber 2 which accommodates a material to be heated. The chamber 2 is connected via a recuperator 3 and boiler 4 with a gas holder 5. The vessel 1 contains a melt 6 which is a heat producer, heat accumulator, heat carrier and gas producer. The material heated 7 is located in the chamber 2.

The vessel 1 and the chamber 2 are separated from one another by partition 8. The partition 8 prevents the penetration of the melt into the chamber 2, whereas gases evolved in the vessel 1 can flow into the chamber through an opening 10. The vessel 1 as well as the chamber 2 are connected with the recuperator 3 by means of flues 11. Distribution of gases flowing to the recuperator 3 directly from the vessel 1 and through the chamber 2 is achieved by means of valves 12. From the recuperator 3, flue gases flow to the boiler 4. Steam produced by the boiler can be used for heating or generating electricity. If combustion products contain a significant amount of CO and $H_2$, they are collected in the gas holder 5. Air and steam are injected into the vessel through tuyeres 13 located under and above the melt surface. Air injected is previously preheated in the recuperator 3. The temperature of the air is controlled by the coal injection between the recuperator 3 and the vessel 1. Coal and flux agents are supplied through the air tuyeres 13 or injected through special openings under and above the melt surface.

Air oxygen is absorbed by the melt and produces oxides of the melt elements. These oxides are reduced by coal. Because of the high vessel temperature, CO gas is produced in this reaction. The temperature and pressure at the vessel determine required composition of flue gases which contain mostly CO, $N_2$ and $H_2$. The melt in the vessel has the form of a gas-liquid emulsion. The volume of the emulsion is determined by the vessel pressure and rate of air injection. The level of the emulsion prevents its inflow into the chamber 2. Heat can be delived to the vessel 1 also by means of flue gases and slag injected into the vessel.

The combustion products evolved in the vessel 1 can be evacuated by an exhauster. In this case, the pressure conditions in the vessel are similar to those in conventional heating furnaces, for example in an open hearth furnace. The high pressure in the vessel can be used to reduce the emulsion volume and to give rise a flow of combustion products. In this case vessel 1 must be sealed. In the vessel 1 coal is converted into CO and $H_2$ and in a small portion into $CO_2$ and $H_2O$. The volatile components of coal, notably $H_2$, can be extracted by means of previous coal roasting and used as a fuel or raw material. Coal can be replaced by a refuse, containing metals, C and H. Gas evolved at the vessel can be partially or totally burned in the vessel 1 or in the chamber 2 by injection of additional air. Excluding C and H, all components of coal are absorbed by melt. Especially, melt composition ensures absorption of sulphur and other environmentally hazardous components. The necessary composition of melt is obtained by use of flux agents. Rate of the air, coal and fluxes injection determines the required temperature and composition of the melt. The excessive amount of the melt is withdrawn from vessel through special openings. The melt circulation is determined by the distribution of the tuyeres for air and coal injection in the vessel 1 and the distribution of the air and coal between the tuyeres.

The melt can be similar to those of a steelmaking convertor. The mass fraction of molten metal in melt may range from 0 to 80%. The most preferable is the melt containing a slag only. A steelmaking converter slag can be replaced by any other material creating form with gas and coal at the temperature of heat treatment, agressively absorbing oxygen, sulphur and ash, and reacting with carbon particles.

Combustion products, mostly CO, $H_2$ and $N_2$, leave melt and enter the heating chamber 2 wherein they flow around the material to be heated. Heat to the chamber 2 is delivered from the vessel 1 through partition 8 and by combustion products passing through the chamber. Heat also can be evolved by the partial or total combustion of CO and $H_2$, contained in the flue gases. To increase heat flow to the chamber 2 from the vessel 1, the chamber is immersed into the melt and air, and coal distribution determines the intensive melt circulation around the partition 8. The partition 8 must be made from a material which can resist corrossion at the melt temperature and has low thermal resistance. Because density of the emulsion is low, the mechanical strength of the partition is not significant. Refractory bricks, ceramic, asbestos or glass sheets, fabric and other materials can be used for partition construction.

Heat exchange between the melt 6 and the material 7 will be increased by the passage of the melt through the chamber 2 by means of hollow enclosure. The effect of the enclosure is similar to that of radiant tubes in conventional furnaces. The flow of melt through the hollow enclosure can be insured by the different rate of air injection in different parts of the vessel. In order to avoid nonuniformity of heating, distribution of air in vessel is changed periodically.

The melt flow through the chamber can be carried out by means of a set of tubes similar to radiant tubes. Solid material can be immersed directly into the melt. The material 7 can be changed through openings located above the melt and positioned on the supports. During blasting, the material to be heated is totally immersed into the emulsion. This insures intensive exchange between the melt and the material heated. Without blasting, the level of the melt is lower than the level of the supports. This enables us to charge and discharge the vessel similarly to the regular industrial furnaces. The process can be carried out in two interconnected vessels similarly to the process in two-hearth open hearth furnaces. This process contains two periods. During the first period the air is injected into the first vessel. Material to be heated in this vessel is immersed into the emulsion and CO is evolved. Combustion products from the first vessel are directed to the second vessel. There is no air injection in the second vessel, the melt level is low, the material heated is not covered by the melt, and heating is carried out by the combustion products evolved in the first vessel. After heating in the first vessel is completed, this vessel is discharged, and a new charge is loaded.

Figure 2:
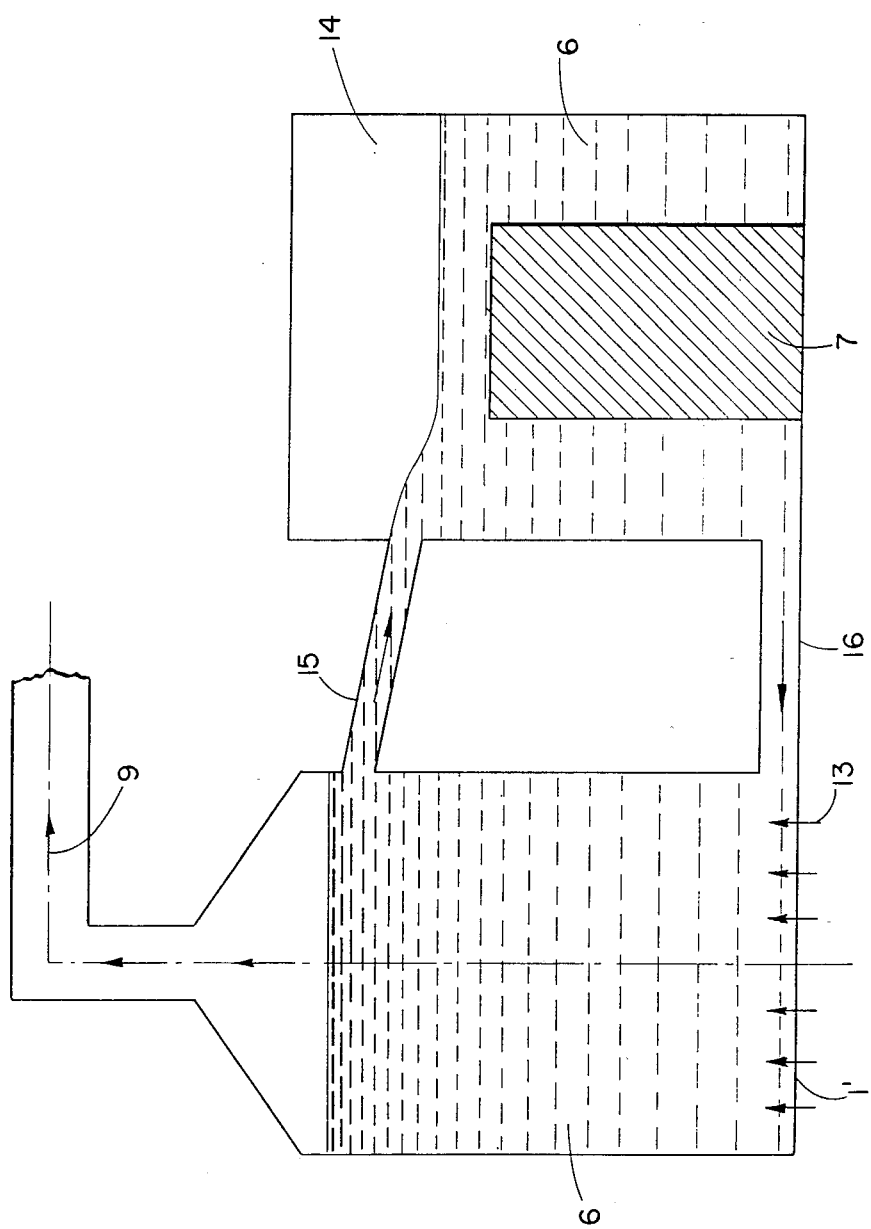
FIG. 2 is a schematic view of an apparatus in which a material to be heated is immersed in a separated vessel, in accordance with the present invention.

The material 7 can be immersed into a melt in a separate vessel 14 connected with a blasted vessel 1' by conduits 15 and 16, as shown in FIG. 2. The melt circulation through the conduits is caused by the difference in the levels and densities of the melt in these vessels. The process according to the invention can be used for heating as well as for melting. Because of the difference in the material densities, melt will be accumulated at the bottom of the vessel.

Heat evolved in the melt 6 can be extracted by liquid material. The heated liquid can be deposited in the chamber 2 so that the level of flue is higher than the level of the deposed liquid. The heated liquid also can be heated by the circulation through enclosures immersed into the melt.

Figure 3:
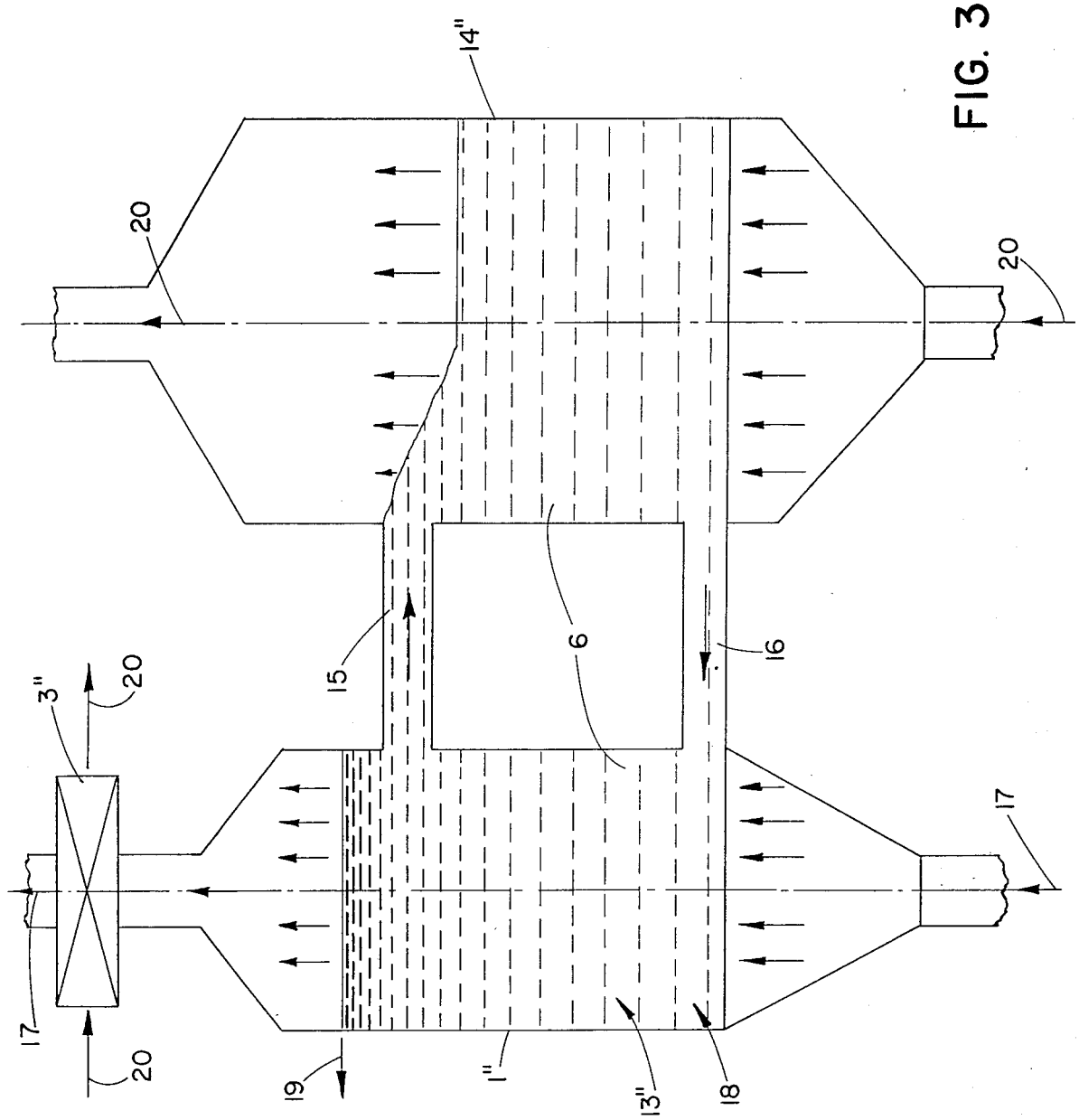
FIG. 3 is a schematic view of an apparatus for gas heating in which heat evolving in a melt and extracting from the melt are carried out in two separate vessels, in accordance with the present invention.

In accordance with the invention, there are provided also an apparatus for and a method of gas heating which comprises a vessel 1" and a vessel 14", and a conventional gas preheater 3", shown in FIG. 3. The melt 6 is deposed in the vessels 1" and 14". The melt contains elements readily oxidized by air and creating oxides readily reduced by carbon. Carbon and air are simultaneously injected into the melt through tuyeres 13". Heat is also delivered in the melt 6 by hot gasses 17 which barbotages the melt layer and leave vessels at the temperature approaching to that of the melt. Gas 17" is a waste product of furnaces and other reactors. Heat contents of a leaving gas 9" is extracted in a conventional preheater 3" or in a boiler. Heat is delivered also by a slag 18 rejected from a melting furnace. The slag 18 is supplied into the melt at the temperature of a melting furnace. The level of the melt in the vessel is sustained constant by withdrawing of extra melt through openings 19.

A heated gas 20 absorbs heat in the preheater 3" and in the vessel 14". After passage of the vessel 14", the gas 20 is supplied to a consumer such as a furnace, turbine and the like. Passing of the melt deposited in the vessel 14", the gas achieved the temperature approaching that of the melt. The temperature of the gas 20 must be higher than the temperature of the melt solidification. The necessary temperature of air entering the vessel 14" can be achieved by the coal injection in the air prior to the entering. The temperature of the heated gas can be controlled by bypassing the vessel 14" by a part of the gas.

The melt 6 absorbs heat in the vessel 1" and rejects it in the vessel 14". The circulation of the melt between the vessels 1" and 14" occurs by means of the conduits 15 and 16. The melt from the vessel 1" flows to the vessel 14" through the conduit 15 because the level of the conduit is higher than the melt level in the vessel 14". The size of the vessel and condition of air and coal injection insure low amount of coal in a melt entering the conduit 15. The melt from the vessel 14" flows to the vessel 1" because of the difference in the melt densities in both vessels. The necessary densities and levels of the gas-liquid emulsion in both vessels are achieved by the control of the gas flows entering these vessels. These levels are also controlled by the static pressure in both vessels. The pressure is kept in the range insuring the necessary volume of the emulsion and required pressure in a gas receiver.

Heat evolving and absorbing can be carried out in the same vessel by periodical supply of a hot gas to a gas consumer; a heating system must be equipped with several periodical preheaters. The pressure in liquid bath can be readily controlled and maintained at the level required by a gas consumer. Pressure in a heat consumer can be different from the pressure in a heat source. For example, the pressure in a furnace flue which is a source, might be different from the pressure in turbine inlet. In this case, the pressure in the vessel must be sustained at two different levels during heat supply to the melt and heat extraction from the melt.

The pressure in the vessels can be maintained at the levels 1-20 atm. This ensures the optimal size of an emulsion and consequently the optimal size of the vessels. The heated gas can be separated from the melt by means of en enclosure immersed into the melt. The pressure inside and outside of the enclosures are approximately equal to one another. This enables us to use ceramics, refractory fabrics and other nonexpensive materials for gas heating to high temperature at high pressure.

The melt 6 can be formed from nonexpensive readily available material having melting point lower than the temperature of gas preheating. For example, the molten pig iron or molten steelmaking slag can be used for gas preheating up to temperature 1300°-1600° C. These melts also can be used for extracting chemical energy of coal. The rate of coal combustion in this melt can make up 2-10% of the mass of melt per minute.

Heat accumulated in the melt 6 can be used for coal conversion. The vessel 1 can be blasted periodically by air and water. Air blasting is carried out into melt to insure total burning of CO in the vessel. The heat collected in the vessel will be consumed for the conversion of H₂O injected after air. The gases obtaned from the coal conversion will be accumulated in the special gas holder which is connected with the vessel 1 only during steam injection. The heat losses in the vessels and other parts of the apparatus are reduced by use of vaporizing cooling system.

EXAMPLE 1

As an example of the present invention, metal heating and melting in a bath of an open hearth furnaces can be considered. The open hearth furnace can be used as the apparatus for melting a scrap with the use of coal as a source of energy. Melted scrap is submerged into conventional slag. Air and coal are supplied into a slag. This results in evolving of heat and CO in the bath. CO is evolved and burned above the slag layer by the preheated air conventionally supplied in the furnace and air from arch tuyeres. There are no gas or liquid fuel involved. The melt obtained can be collected at the bottom of the bath and is withdrawn continuously or periodically. As well as for melting, the open hearth furnace can be used for metal heating. In this case, slabs or ingots are immersed into a slag layer. When a required metal temperature is attained, they are withdrawn from the furnace.

EXAMPLE 2

As another example, heating in reconstructed soaking pits may be depicted. The chamber of a soaking pit is sealed and filled with a slag. Ingots to be heated are submerged into the slag. Air and coal are injected in this slag. Special tuyeres are used for combustion of CO evolved above the slag layer. Another possibility consists withdrawing of CO through sealed flues and collecting it in a gas holder. Heating in a slag layer provides for uniformity of ingots temperature and protection of ingot surface from oxidation.

EXAMPLE 3

The invented heater can be used for preheating of gases, for example, protective gases for furnaces, and terminating in such a way the process of combustion in heating furnaces. In this way of energy supply into a furnace, it is possible to terminate the use of oil and gas fuel for heating.

EXAMPLE 4

The invented apparatus can be utilized for preheating of combustion air. In such a way, air temperature can be increased up to 1300°–1600° C., and expensive refractory materials can be replaced by nonexpensive melt. By replacing cowper apparatuses by the inventive apparatus, the temperature of air injected into a blast furnace can achieve 1300°–1600° C.

EXAMPLE 5

High temperature preheating of air injected into a converter for matte blasting makes possible to complete copper production in a converter. The necessity in reverbaratory or other melting furnaces will be terminated.

EXAMPLE 6

A heated gas can be replaced by water. In such a way. the invented heater can replace boiler by a pressurized vessel and terminate the need in expensive materials for water vaporization. This also terminates the use of oil and gas for steam generation and replaces it by coal. A steam generator may have the form of a single vessel where heat is periodically evolved and extracted. Steam generator may also have the form of two connected vessels. One of these vessels is used for evolving heat and CO and N₂ by means of air and coal injection into a melt. The evolved gas can be used in a conventional boiler. The second vessel is used for steam generation.

While the invention has been illustrated and described above, it is not limited to the details shown, inasmuch as various modifications and structural changes are possible without departing in any way from the spirit of the present invention.

What is claimed as desired to be protected by Letters Patent is set forth in the appended claims.

I claim:

1. A method of continously generating steam comprising injecting air and coal into molten metal contained in a first vessel, transferring the melt thus injected with said coal and air into a second vessel, injecting water into the melt contained in the second vessel thereby generaling steam of sufficient quality to operate a turbene and transferring the melt from the second vessel back to the first vessel.

* * * * *